United States Patent
Farhadi et al.

(10) Patent No.: US 11,265,737 B2
(45) Date of Patent: Mar. 1, 2022

(54) CELL SHAPING IN A WIRELESS COMMUNICATIONS NETWORK

(71) Applicant: Telefonaktiebolaget LM Ericsson (publ), Stockholm (SE)

(72) Inventors: Hamed Farhadi, Stockholm (SE); Niklas Jaldén, Enköping (SE); Nafiseh Shariati, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 67 days.

(21) Appl. No.: 16/772,199

(22) PCT Filed: Dec. 13, 2017

(86) PCT No.: PCT/EP2017/082536
§ 371 (c)(1),
(2) Date: Jun. 12, 2020

(87) PCT Pub. No.: WO2019/114940
PCT Pub. Date: Jun. 20, 2019

(65) Prior Publication Data
US 2021/0076231 A1 Mar. 11, 2021

(51) Int. Cl.
*H04W 4/00* (2018.01)
*H04W 24/02* (2009.01)
*H04W 16/28* (2009.01)

(52) U.S. Cl.
CPC .......... *H04W 24/02* (2013.01); *H04W 16/28* (2013.01)

(58) Field of Classification Search
CPC ..... H04W 24/00; H04W 24/08; H04W 80/04; H04W 84/18; H04W 88/06; H04W 88/08;
(Continued)

(56) References Cited

U.S. PATENT DOCUMENTS

| 2012/0052828 | A1* | 3/2012 | Kamel | H04B 17/104 455/226.2 |
| 2014/0086071 | A1* | 3/2014 | Hu | H04B 7/0689 370/252 |
| 2015/0141027 | A1* | 5/2015 | Tsui | H04W 24/02 455/452.1 |

FOREIGN PATENT DOCUMENTS

| WO | 2016/055092 A1 | 4/2016 |
| WO | 2016/096001 A1 | 6/2016 |

(Continued)

OTHER PUBLICATIONS

International Search Report and Written Opinion issued in international Application No. PCT/EP2017/082536 dated Aug. 21, 2018 (9 pages).

*Primary Examiner* — Temica M Beamer
(74) *Attorney, Agent, or Firm* — Rothwell, Figg, Ernst & Manbeck, P.C.

(57) ABSTRACT

There is provided mechanisms for shaping cells in a wireless communications network. A method is performed by a network node. The method comprises obtaining spatial channel characteristics of a set of currently and/or previously served terminal devices in the wireless communications network, wherein the spatial channel characteristics are indicative of a current collective first network performance metric value for the set of currently and/or previously served terminal devices. The method comprises identifying, using the spatial channel characteristics, those terminal devices of the set of currently and/or previously served terminal devices that have an individual second network performance metric value below a threshold value by comparing the individual second network performance metric value for each of the currently and/or previously served terminal devices to the threshold value. The method comprises determining beam forming parameters for shaping the cells based (Continued)

on the identified terminal devices, wherein the cells are shaped to increase an individual first network performance metric value for the identified terminal devices, wherein the beam forming parameters give rise to a modified set of terminal devices being served in wireless communications network, and wherein spatial channel characteristics of the modified set of terminal devices are indicative of a new collective first network performance metric value for the modified set of terminal devices. The method comprises providing a notification of the determined beam forming parameters to a radio access network node only when the new collective first network performance metric value is not worse than the current collective first network performance metric value.

20 Claims, 9 Drawing Sheets

(58) Field of Classification Search
CPC ... H04L 1/0009; H04L 1/0003; H04L 1/0026; H04L 1/20; H04B 17/0042; H04B 17/0057
USPC .......................... 370/328; 455/67.11, 67.13
See application file for complete search history.

(56) References Cited

FOREIGN PATENT DOCUMENTS

| WO | 2016/146172 A1 | 9/2016 |
| WO | 2017/010738 A1 | 1/2017 |

* cited by examiner

CELL SHAPING IN A WIRELESS COMMUNICATIONS NETWORK

CROSS REFERENCE TO RELATED APPLICATION(S)

This application is a 35 U.S.C. § 371 National Stage of International Patent Application No. PCT/EP2017/082536, filed Dec. 13, 2017, designating the United States.

TECHNICAL FIELD

Embodiments presented herein relate to a method, a network node, a computer program, and a computer program product for shaping cells in a wireless communications network.

BACKGROUND

In wireless communications networks, there may be a challenge to obtain good performance and capacity for a given communications protocol, its parameters and the physical environment in which the wireless communications network is deployed.

For example, one component in providing good performance and capacity for a given communications protocol in a wireless communications network is the antenna systems used by the radio access network (RAN) nodes in the wireless communications network and/or the terminal devices (TDs) with which the radio access network nodes communicate so as to provide network coverage for the terminal devices.

Advanced antenna systems may be used to significantly enhance performance of wireless communication systems in both uplink (UL, i.e., from terminal device to radio access network node) and downlink (DL, i.e., from radio access network node to terminal device). In the downlink, there are three basic approaches for utilizing the antenna: diversity, multiplexing and beam forming.

With beam forming, the radiation pattern of the antenna may be controlled by transmitting a signal from a plurality of elements with an element specific gain and phase. In this way, radiation patterns with different gains, pointing directions, and transmission and/or reception beam widths (in both elevation and azimuth directions) may be created.

With so called device specific beam forming, (narrower) beams may be formed to specific terminal devices in order to increase the received signal power in these specific TDs while at the same time controlling interference generated to other terminal devices receiving data transmission.

In further detail, in cellular wireless communications networks, there is a geographical area associated with a radio access network node referred to as a cell, whose boundaries are determined based on the relative strength of certain types of signals. In some cellular wireless communications networks, such as Long Term Evolution (LTE), so-called cell specific reference signals (CRS) are typically used for this purpose. More specifically, the cell is the area where a CRS signal is, by a terminal device, received with a power greater than a threshold power value, which is the minimum power value for decoding (signal to noise ratio; SNR, or signal to interference plus noise ratio; SINR, or signal to interference ratio; SIR), and at a power value greater than that of CRSs transmitted from other radio access network nodes. By changing the antenna gain (beam forming/beam shaping), the network coverage of a CRS for a certain cell may be altered. Changing the antenna diagram to alter the coverage region of cell-defining signals, and hence the network coverage of the radio access network node, is commonly referred to as "cell shaping". One issue with changing the antenna diagram to alter the network coverage, is that there is both a possibility to improve network coverage in certain locations, as well as reducing/removing network coverage for some other locations.

Hence, there is still a need for an improved cell shaping in wireless communications networks.

SUMMARY

An object of embodiments herein is to provide efficient cell shaping in a wireless communications network.

According to a first aspect there is presented a method for shaping cells in a wireless communications network. The method is performed by a network node. The method comprises obtaining spatial channel characteristics of a set of currently and/or previously served terminal devices in the wireless communications network, wherein the spatial channel characteristics are indicative of a current collective first network performance metric value for the set of currently and/or previously served terminal devices. The method comprises identifying, using the spatial channel characteristics, those terminal devices of the set of currently and/or previously served terminal devices that have an individual second network performance metric value below a threshold value by comparing the individual second network performance metric value for each of the currently and/or previously served terminal devices to the threshold value. The method comprises determining beam forming parameters for shaping the cells based on the identified terminal devices, wherein the cells are shaped to increase an individual first network performance metric value for the identified terminal devices, wherein the beam forming parameters give rise to a modified set of terminal devices being served in wireless communications network, and wherein spatial channel characteristics of the modified set of terminal devices are indicative of a new collective first network performance metric value for the modified set of terminal devices. The method comprises providing a notification of the determined beam forming parameters to a radio access network node only when the new collective first network performance metric value is not worse than the current collective first network performance metric value.

According to a second aspect there is presented a network node for shaping cells in a wireless communications network. The network node comprises processing circuitry. The processing circuitry is configured to cause the network node to obtain spatial channel characteristics of a set of currently and/or previously served terminal devices in the wireless communications network, wherein the spatial channel characteristics are indicative of a current collective first network performance metric value for the set of currently and/or previously served terminal devices. The processing circuitry is configured to cause the network node to identify, using the spatial channel characteristics, those terminal devices of the set of currently and/or previously served terminal devices that have an individual second network performance metric value below a threshold value by comparing the individual second network performance metric value for each of the currently and/or previously served terminal devices to the threshold value. The processing circuitry is configured to cause the network node to determine beam forming parameters for shaping the cells based on the identified terminal devices, wherein the cells are shaped to increase an individual first network performance metric value for the identified terminal devices, wherein the beam forming parameters give rise to a modified set of terminal devices being served in wireless communications network, and wherein spatial channel characteristics of the modified set of terminal devices are indicative of a new collective first network performance metric value for the modified set of terminal devices. The processing circuitry is configured to cause the network node to provide a notification of the determined beam forming parameters to a radio access network node only when the new collective first network performance metric value is not worse than the current collective first network performance metric value.

According to a third aspect there is presented a network node for shaping cells in a wireless communications network. The network node comprises an obtain module configured to obtain spatial channel characteristics of a set of currently and/or previously served terminal devices in the wireless communications network, wherein the spatial channel characteristics are indicative of a current collective first network performance metric value for the set of currently and/or previously served terminal devices. The network node comprises an identify module configured to identify, using the spatial channel characteristics, those terminal devices of the set of currently and/or previously served terminal devices that have an individual second network performance metric value below a threshold value by comparing the individual second network performance metric value for each of the currently and/or previously served terminal devices to the threshold value. The network node comprises a determine module configured to determine beam forming parameters for shaping the cells based on the identified terminal devices, wherein the cells are shaped to increase an individual first network performance metric value for the identified terminal devices, wherein the beam forming parameters give rise to a modified set of terminal devices being served in wireless communications network, and wherein spatial channel characteristics of the modified set of terminal devices are indicative of a new collective first network performance metric value for the modified set of terminal devices. The network node comprises a provide module configured to provide a notification of the determined beam forming parameters to a radio access network node only when the new collective first network performance metric value is not worse than the current collective first network performance metric value.

According to a fourth aspect there is presented a computer program for shaping cells in a wireless communications network, the computer program comprising computer program code which, when run on a network node, causes the network node to perform a method according to the first aspect.

According to a fifth aspect there is presented a computer program product comprising a computer program according to the fourth aspect and a computer readable storage medium on which the computer program is stored. The computer readable storage medium could be a non-transitory computer readable storage medium.

Advantageously this method, these network nodes, this computer program and this computer program product provide efficient cell shaping in the wireless communications network.

Advantageously this method, these network nodes, this computer program and this computer program product enable network coverage to be expanded as well as the quality of received signals to be improved for terminal devices already within network coverage.

Advantageously this method, these network nodes, this computer program and this computer program product enable cell shaping in a wireless communications network in accordance with time-varying spatial distribution of the terminal devices.

Advantageously this method, these network nodes, this computer program and this computer program product enable the downlink network coverage to be improved by the number of terminal devices for which, for example, received uplink SNR is larger than a given acceptable threshold SNR, being increased.

Advantageously this method, these network nodes, this computer program and this computer program product enable not only the strength of the desired signal but also the interference for computing the optimum antenna tilt to be taken into account, enables robustness against a possible worst-case interference scenario, when used in the wireless communications network.

Advantageously this method, these network nodes, this computer program and this computer program product enable the beam forming parameters to be determined based on only partial information about the wireless communications network, for example without requiring information from terminal devices outside network coverage.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art.

Like numbers refer to like elements throughout the description. Any step or feature illustrated by dashed lines should be regarded as optional.

Figure 1A:
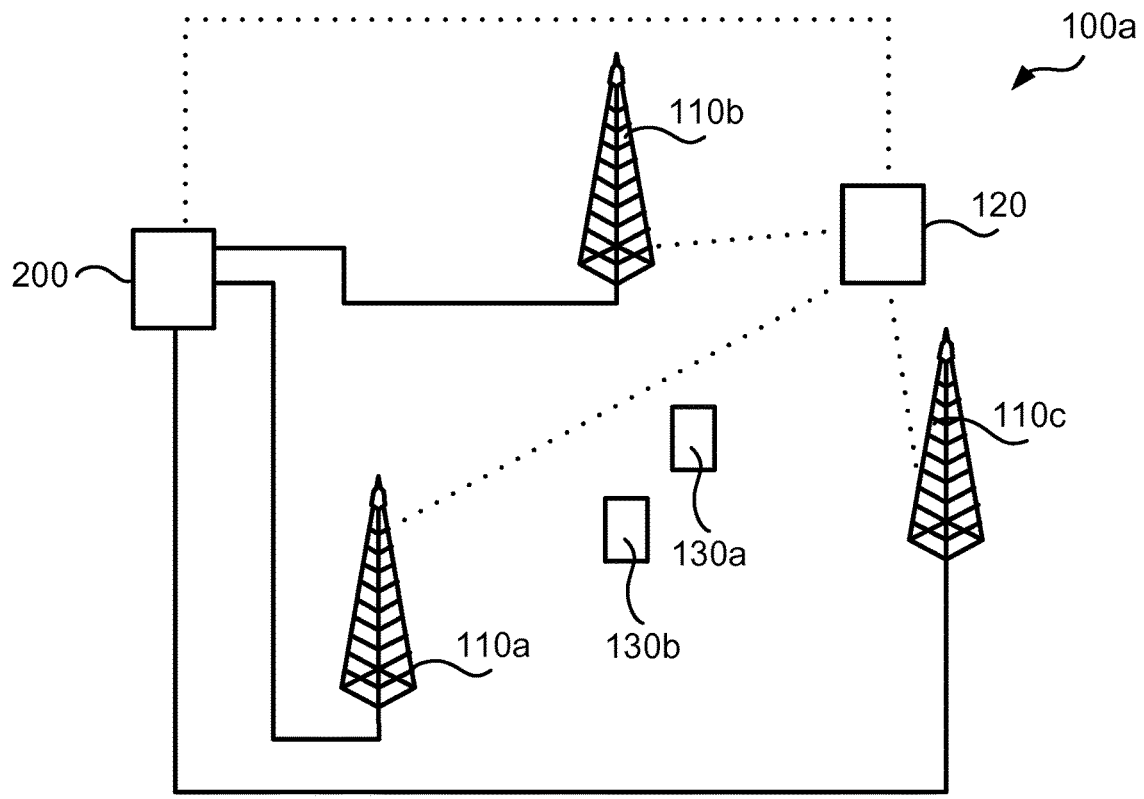
FIG. 1 is a schematic diagram illustrating a wireless communications network according to embodiments.

FIG. 1a is a schematic diagram illustrating a wireless communications network 100a where embodiments presented herein can be applied. The wireless communications network 100a comprises radio access network nodes (RANNs) 110a, 110b 110c. The radio access network nodes 110a, 110b 110c may be any combination of radio base stations such as base transceiver stations, node Bs, evolved node Bs, g node Bs, access points, etc. The radio access network nodes 110a, 110b 110c may further be any combination of macro radio access network nodes, and micro, or pico, radio access network nodes. Each radio access network node 110a, 110b, 110c provides network coverage in a respective coverage region (see, FIG. 1b) by transmitting transmission beams in that coverage region. Each such coverage region forms a cell 140a, 140b, 140c. Hence, the wireless communications network 100a, may regarded as a cellular wireless communications network. Each radio access network node 110a, 110b, 110c is assumed to be operatively connected to a core network, as exemplified by one central network node 120. In some embodiments the central network node 120 is radio network controller (RNC). The core network may in turn be operatively connected to a service and data providing wide area network, such as the Internet. The radio access network nodes 110a, 110b, 110c may further be operatively connected to a network node 200. The network node 200, which may be a centralized network node, will be further disclosed below.

Hence, a terminal device 130a, 130b served by one of the radio access network nodes 110a, 110b, 110c may thereby access services and data as provided by the wide area network. The terminal devices 130a, 130b may be any combination of mobile stations, mobile phones, handsets, wireless local loop phones, user equipment (UE), smartphones, laptop computers, tablet computers, network equipped sensors, Internet of Things devices, and/or network equipped vehicles.

Figure 1B:
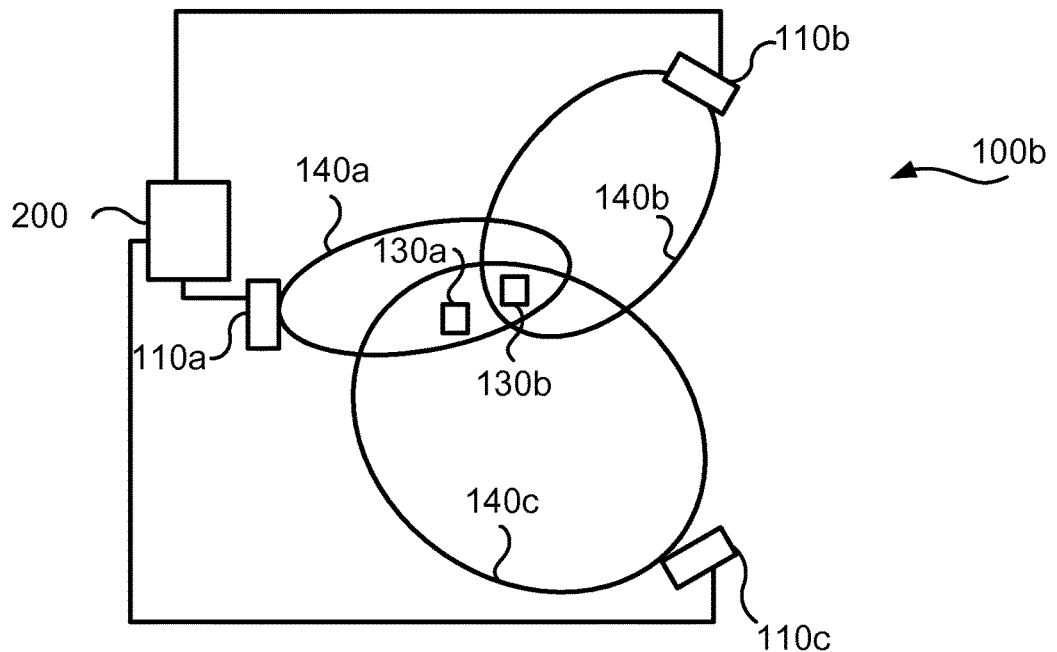

FIG. 1b is another schematic diagram illustrating a wireless communications network 100b where embodiments presented herein can be applied. The wireless communications network 100b of FIG. 1b is similar to the wireless communications network 100a of FIG. 1a but differs that the central network node 120 is not illustrated. Further, in the illustrative example of FIG. 1b the coverage regions, or cells 140a, 140b, 140c of each radio access network node 110a, 110b, 110c have been schematically illustrated. Each cell 140a, 140b, 140c can be shaped by applying beam forming parameters at the radio access network nodes 110a, 110b, 110c. According to the illustrative example of FIG. 1b terminal device 130a is assumed to be served by radio access network node 10a in cell 140a but might suffer some interference from cell 140c of RANN 110c. Further, cell 140a of radio access network node 110a might be a candidate cell for serving terminal device 130b, but because of cells 140b and 140c, terminal device 130b is assumed to suffer from such high amount of interference that it cannot be served by radio access network node 110a.

Hence, the SIR of terminal device 130b is assumed to be so low that terminal device 130b is out of network coverage.

Figure 1C:
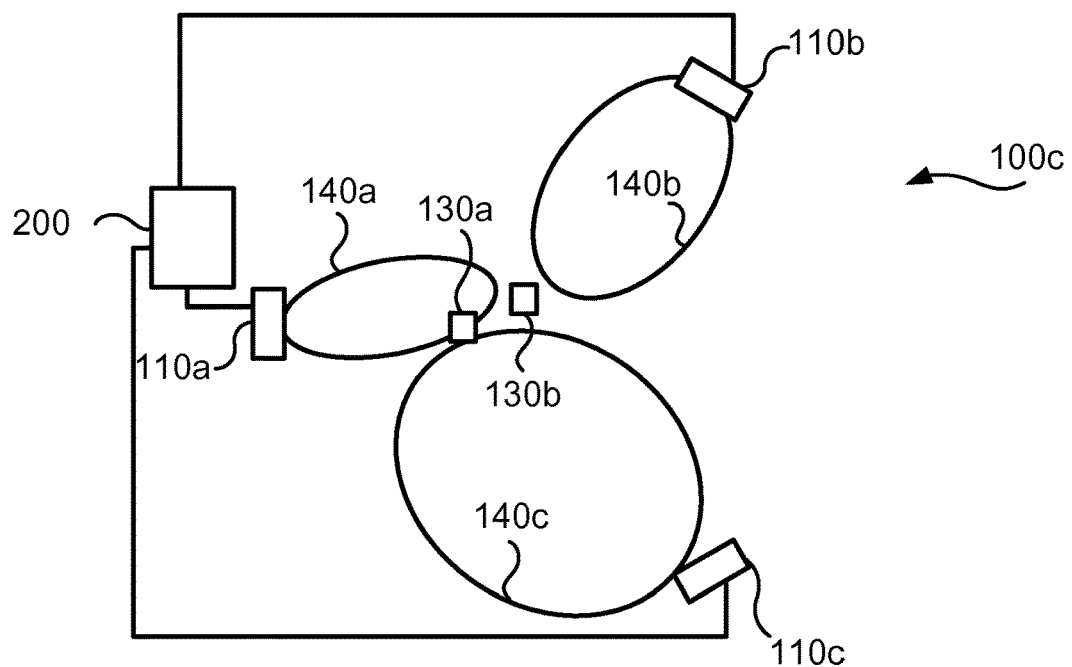

FIG. 1c is another schematic diagram illustrating a wireless communications network 100c where embodiments presented herein can be applied. The wireless communications network 100c of FIG. 1c is similar to the wireless communications network 110b of FIG. 1b but differs in the way the cells 140a, 140b, 140c are shaped. According to the illustrative example of FIG. 1c terminal device 130a is, although located close to the cell edge, assumed to be served by radio access network node 110a in cell 140a. Further, terminal device 130b is not inside any of the cells 140a, 140b, 140c and therefore does not have any network connection. Hence, the SNR of terminal device 130b is assumed to be so low that terminal device 130b is out of network coverage.

The embodiments disclosed herein relate to mechanisms for shaping cells 140a, 140b, 140c in a wireless communications network 100a, 100b, 100c, 100d that could help network coverage to be established for terminal device 130b. In order to obtain such mechanisms there is provided a network node 200, 110a, 110b, 110c, a method performed by the network node 200, 110a, 110b, 110c, a computer program product comprising code, for example in the form of a computer program, that when run on a network node 200, 110a, 110b, 110c, causes the network node 200, 110a, 110b, 110c to perform the method.

At least some of the herein disclosed embodiments are based on identifying current weak terminal devices (using a second network performance metric), determining beam settings that optimizes at least one key performance indicator (KPI) (using a first network performance metric), and applying the determined beam setting if the network performance as a whole does not decrease (for all terminal devices, including potential new terminal devices within network coverage) by checking against the at least one KPI.

Figure 2:
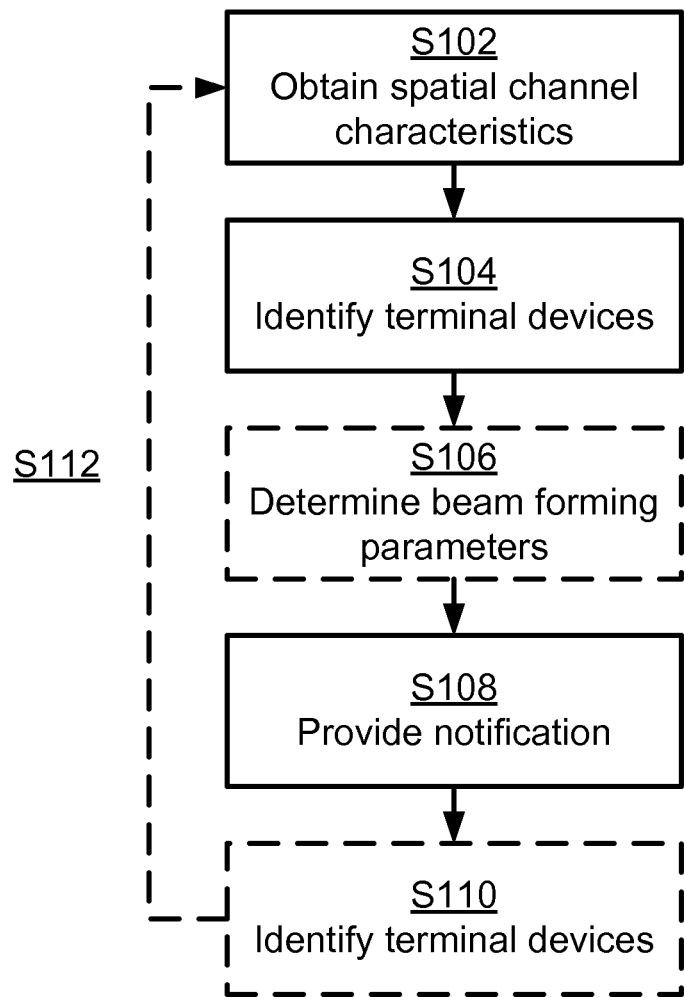
FIGS. 2, 4, and 5 are flowcharts of methods according to embodiments.

FIG. 2 is a flowchart illustrating embodiments of methods for shaping cells 140a, 140b, 140c in a wireless communications network 100a, 100b, 100c, 100d. The methods are performed by the network node 200, 110a, 110b, 110c. The methods are advantageously provided as computer programs 1120. Particularly, the network node 200, 110a, 110b, 110c is configured to perform steps S102-S108:

S102: The network node 200, 110a, 110b, 110c obtains spatial channel characteristics of a set of currently and/or previously served terminal devices 130a in the wireless communications network 100a, 100b, 100c, 100d. The spatial channel characteristics are indicative of a current collective first network performance metric value for the set of currently and/or previously served terminal devices 130a. Examples of first network performance metrics will be disclosed below. The set of currently and/or previously served terminal devices might be characterized as terminal devices already within network coverage.

S104: The network node 200, 110a, 110b, 110c identifies, using the spatial channel characteristics, those terminal devices of the set of currently and/or previously served terminal devices 130a that have an individual second network performance metric value being worse than a threshold value. These terminal devices are identified by comparing the individual second network performance metric value for each of the currently and/or previously served terminal devices 130a to the threshold value. In this respect, depending on the type of second network performance metric used, either the terminal devices with second network performance metric values above the threshold value or the terminal devices with second network performance metric values below the threshold value are identified in step S104. Examples of second network performance metrics will be disclosed below. These terminal devices might thus be characterized as terminal devices outside network coverage.

S106: The network node 200, 110a, 110b, 110c determines beam forming parameters for shaping the cells 140a, 140b, 140c based on the identified terminal devices. The cells 140a, 140b, 140c are shaped to increase an individual first network performance metric value for the identified terminal devices. The beam forming parameters give rise to a modified set of terminal devices 130a, 130b being served in wireless communications network 100a, 100b, 100c, 100d. Spatial channel characteristics of the modified set of terminal devices 130a, 130b are indicative of a new collective first network performance metric value for the modified set of terminal devices 130a, 130b.

S108: The network node 200, 110a, 110b, 110c provides a notification of the determined beam forming parameters to a radio access network node 110a, 110b, 110c. The notification is provided only when the new collective first network performance metric value is not worse than the current collective first network performance metric value.

Advantageously, the steps S102-S108 enables, by the use of information about existing network nodes and currently and/or previously served terminal devices, the network coverage to be expanded, and hence reduce coverage holes.

Figure 1D:
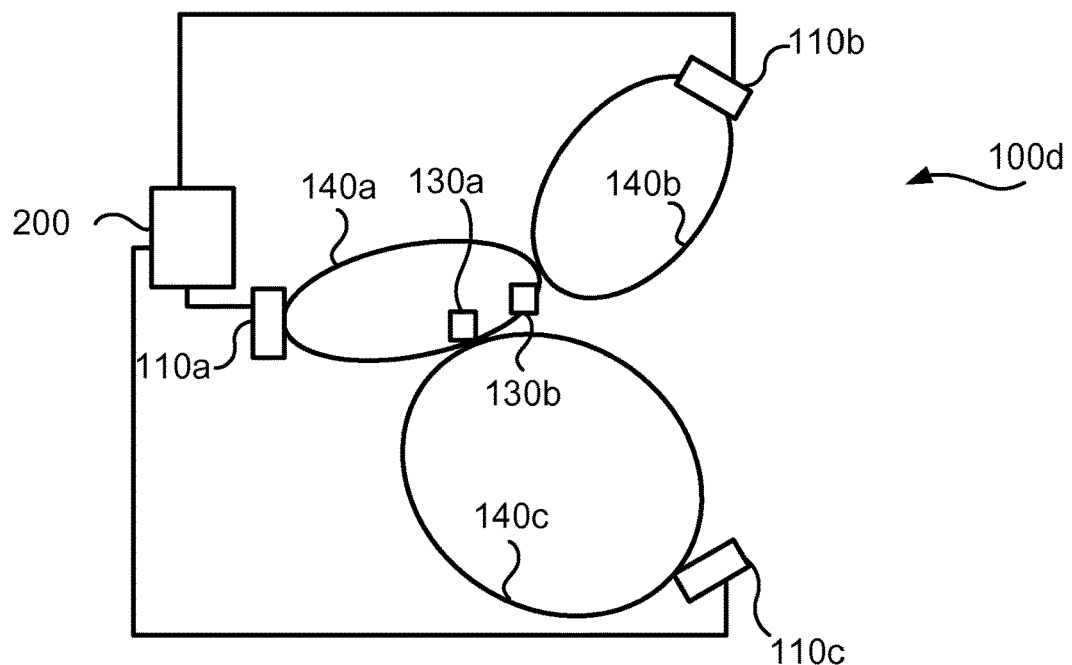

Parallel reference is now made to FIG. 1d. FIG. 1d is another schematic diagram illustrating a wireless communications network 100d where embodiments presented herein can be applied. The wireless communications network 100d of FIG. 1d is similar to the wireless communications networks 100b, 100c of FIGS. 1b, 1c but differs in the way the cells 140a, 140b, 140c are shaped. By performing steps S102-S108 the cells 140a, 140b, 140c have been reshaped such that the SNR/SIR/SINR of terminal device 130a has improved and such that, as a consequence, terminal device 130b is brought inside network coverage.

Embodiments relating to further details of shaping cells 140a, 140b, 140c in a wireless communications network 100a, 100b, 100c, 100d as performed by the network node 200, 110a, 110b, 110c will now be disclosed.

As specified in step S108, the notification is provided to a radio access network node 110a, 110b, 110c. In general terms, the beam forming parameters might be determined for, and notified to, a plurality of radio access network nodes 110a, 110b, 110c. Particularly, according to an embodiment, beam forming parameters for shaping the cells 140a, 140b, 140c are determined for, and the notification provided to, at least two radio access network nodes 110a, 110b, 110c.

There may be different examples of second network performance metrics. Particularly, according to an embodiment, the second network performance metric value is an SNR value, a SIR value, a SINR value, a signal power value, a bit/frame/packet error rate (BER/PER/FER) value, or a throughput value.

Likewise, the threshold value is a value of the second network performance metric used. That is, if the second network performance metric is SNR, then the threshold value is an SNR value, etc. In this respect, if the second network performance metric is SNR, SIR or SINR, those terminal devices with second network performance metric values below the threshold value are selected in step S104. Further in this respect, if the second network performance metric is BER, PER, or FER, those terminal devices with second network performance metric values above the threshold value are selected in step S104.

In some aspects the first network performance metric represents a KPI to be optimized. Particularly, according to an embodiment, the first network performance metric value acts as a KPI value, and the beam forming parameters are determined so as to optimize the KPI.

There may be different examples of first network performance metrics. Particularly, according to an embodiment, the first network performance metric value is a SIR value, an average throughput value, an SNR value, an SINR value, a signal power value, or a BER/PER/FER value.

In general terms, the second network performance metric might be different from the first network performance metric or identical to the first network performance metric.

There may be different factors on which the first network performance metric value is based. Particularly, according to an embodiment, the first network performance metric value for a given one of the terminal devices 130a is based on at least one of transmit power, path loss, and antenna gain for that given terminal device.

In some aspects the first network performance metric value for each terminal device is a function of pointing direction of one or more radio access network node 110a, 110b, 110c. Particularly, according to an embodiment, the first network performance metric value for a given one of the terminal devices 130a is a function of pointing direction of the radio access network node 110a, 110b, 110c.

There could be different ways to determine the SIR. According to one non-limiting example, the network node 200, 110a, 110b, 110c determines the SIR at each terminal device by taking the transmit power, path loss, and the antenna gain into account.

Figure 3:
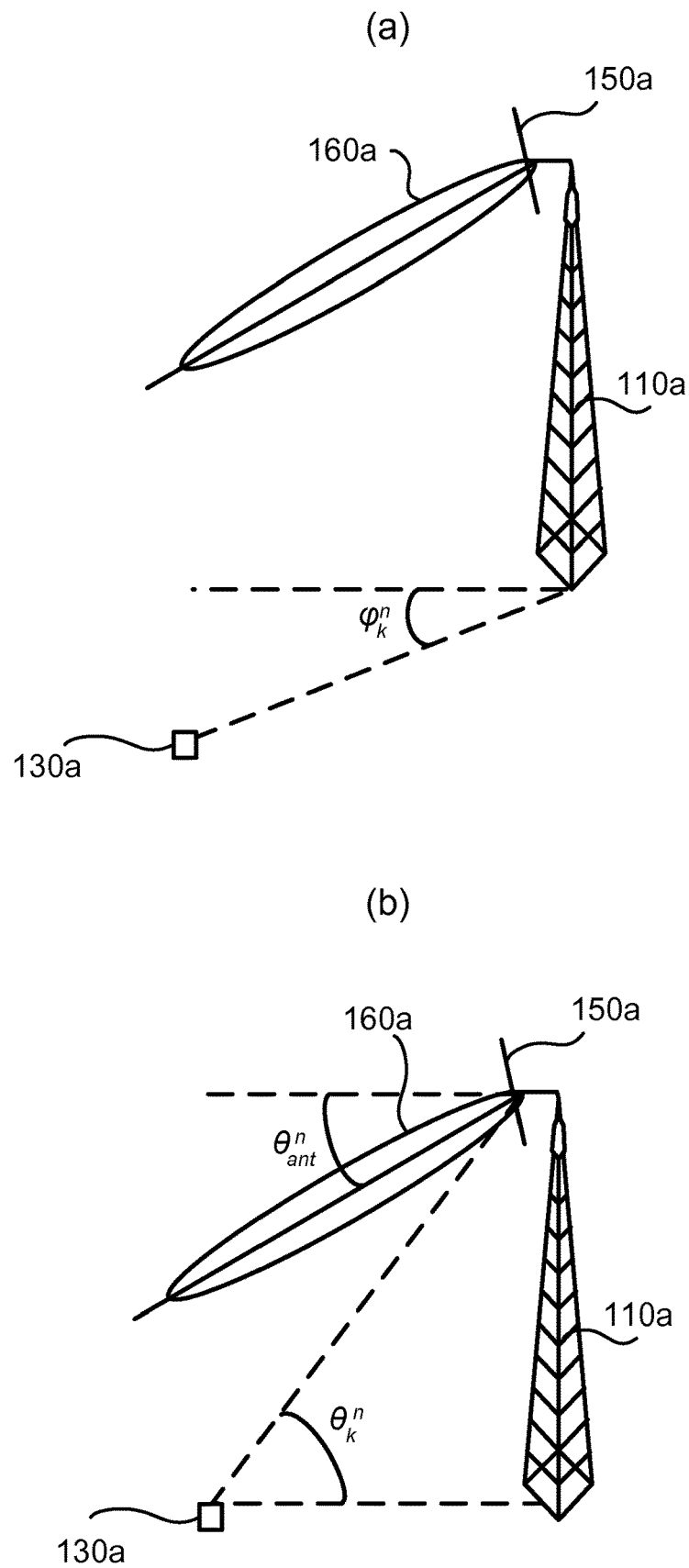
FIG. 3 schematically illustrates a radio access network node and a terminal device according to an embodiment.

Intermediate reference is now made to FIG. 3. FIG. 3 schematically illustrates a radio access network node 110a transmitting in a beam 160a from its antenna array 150a towards a terminal device 130a. in some aspects beam 160a corresponds to cell 140a. FIG. 3 at (a) schematically illustrates that the link established in beam 140a from radio access network node 110a to the terminal device 130a has a horizontal direction $\varphi_k^n$. FIG. 3 at (b) schematically illustrates that the beam 160a is transmitted from the antenna array 150a, and thus from the radio access network node 110a, in an antenna tilt direction $\theta_{ant}^n$ and received by the terminal device 130a in a vertical direction $\theta_k^n$.

Figure 4:
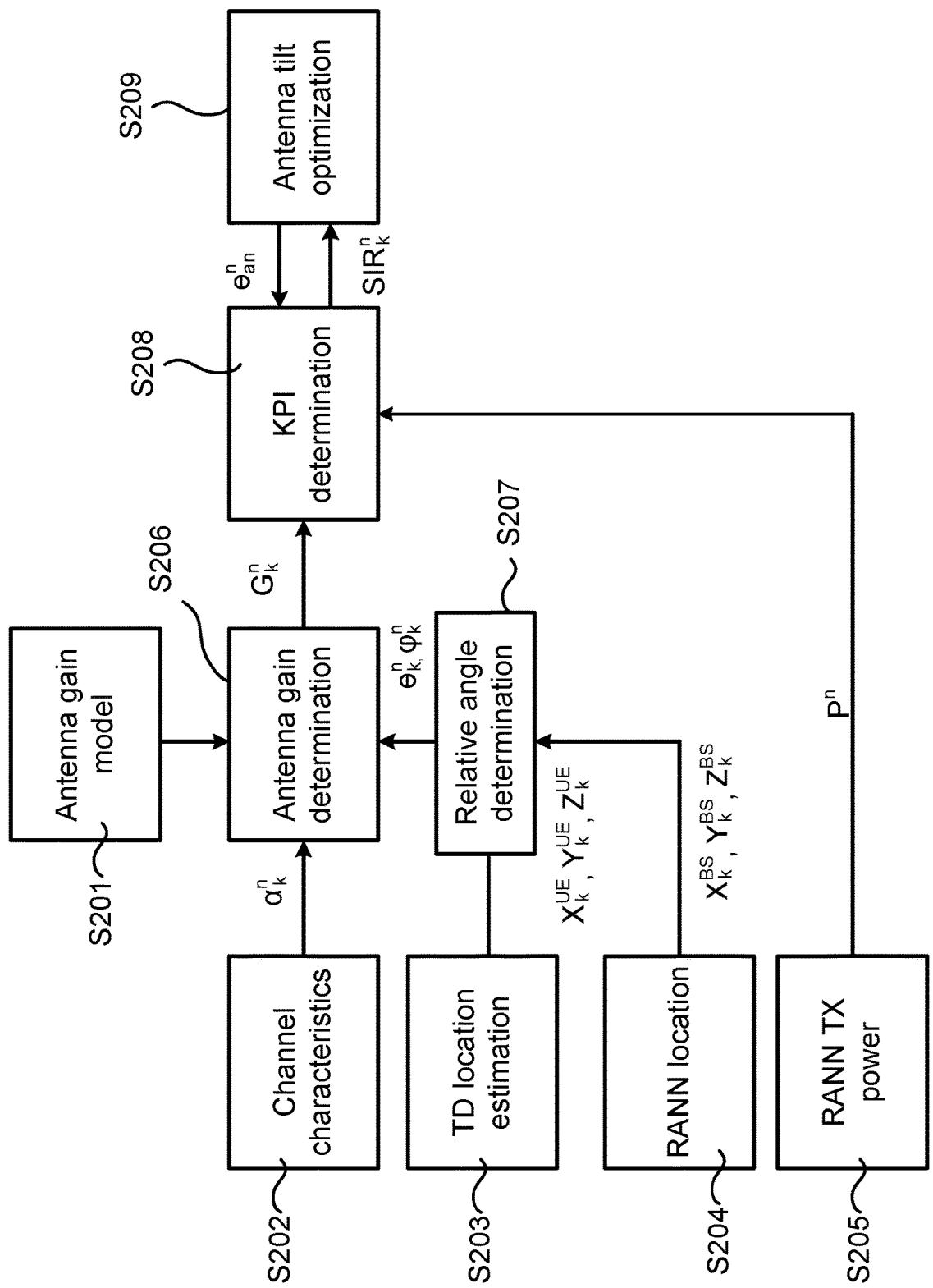

Intermediate reference is now made to FIG. 4. FIG. 4 is a flowchart illustrating one embodiment for determining the SIR per terminal device. According to the present non-limiting example, the antenna gain is determined based on a given antenna gain model (S201; antenna gain model) and using the relative location of terminal devices (S203; terminal device location estimation) and radio access network nodes (S204; radio access network node location) as input, as described in the following. Given the location of terminal devices and radio access network node, the angles phi ($\varphi_k^n$) and theta ($\theta_k^n$) corresponding to the link between terminal device k and radio access network node n are determined (S207; relative angle determination). Further, using the antenna gain model, the antenna gain $G_k^n$ from radio access network node n to terminal device k can be determined (S206; antenna gain determination) as a function of the corresponding antenna tilt ($\theta_{ant}^n$) and antenna horizontal direction ($\varphi_{ant}^n$) as well as from spatial channel characteristics (S202; channel characteristics). The estimated path loss ($\alpha_k^n$) from radio access network node n to terminal device k and the transmit power ($P^n$) of radio access network node n could, for example, be collected from a database or from the radio access network node n itself (S205; radio access network node transmit power). The SIR at each terminal device is, according to the present illustrative example, determined as a function of antenna tilt of all antennas of all radio access network nodes 110a, 110b, 110c (S208; KPI determination).

Particularly, according to an embodiment the SIR between terminal device k and radio access network node n is denoted $SIR_k^n$ and is determined as:

$$SIR_k^n = \frac{P^n G_k^n(\theta_k^n, \varphi_k^n, \theta_{ant}^n, \varphi_{ant}^n)\alpha_k^n}{\sum_{m \in N - \{n\}} P^m G_k^m(\theta_k^m, \varphi_k^m, \theta_{ant}^m, \varphi_{ant}^m)\alpha_k^m}$$

Optimum tilt can be determined (S209; antenna tilt optimization) by solving:

$$\max_{\theta_{ant}^1, \ldots, \theta_{ant}^N} \sum_{n \in N} \frac{1}{|K^n|} \sum_{k \in K^n} SIR_k^n$$

Here, $K^n$ is the set of terminal devices that have network coverage from radio access network node n.

In some aspects, the first network performance metric value is determined as:

$$KPI_k^n = f(P^1, \ldots, P^N, G_k^1, \ldots, G_k^N, \theta_k^1, \ldots \theta_k^N, \varphi_k^1, \ldots \varphi_k^N, \theta_{ant}^1, \ldots \theta_{ant}^N, \varphi_{ant}^1, \ldots \varphi_{ant}^N, \alpha_k^1, \ldots \alpha_k^N).$$

The optimum antenna tilt values might then be used for KPI determination (e.g. the number of terminal devices in the coverage area) in the next iteration. By using optimized tilts and consequently a larger coverage, an increased number of terminal devices 130a, 130b would be able to be within network coverage of the radio access network nodes 110a, 110b, 110c. Hence, more accurate information from the network 100a, 100b, 100c can be collected in the databases. This improves the accuracy of the tilt optimization algorithm in the next iterations.

In some aspects the network node 200, 110a, 110b, 110c verifies that network coverage is not lost for the currently and/or previously served terminal devices 130a. There may be different ways for the network node 200, 110a, 110b, 110c to verify that network coverage is not lost.

In some aspects the network node 200, 110a, 110b, 110c verifies that network coverage is not lost for the currently and/or previously served terminal devices 130a regardless of how old the channel characteristics are. Particularly, according to an embodiment, the notification only is provided when each terminal device 130a of the set of currently and/or previously served terminal devices 130a is also part of the modified set of terminal devices 130a, 130b, and/or where there are more terminal devices in the modified set of terminal devices than in the set of currently and/or previously served terminal devices.

In some aspects the network node 200, 110a, 110b, 110c verifies that network coverage is not lost for the currently and/or previously served terminal devices 130a only if the channel characteristics are not too old. Particularly, according to an embodiment, the notification only is provided when each terminal device 130a of the set of currently and/or previously served terminal devices 130a having spatial channel characteristics not older than a threshold time value is also part of the modified set of terminal devices 130a, 130b, and/or where there are more terminal devices in the modified set of terminal devices than in the set of currently and/or previously served terminal devices.

There may be different examples of spatial channel characteristics. In general terms, the spatial channel characteristics characterize the propagation conditions between the terminal devices and the radio access network nodes. Particularly, according to an embodiment, the spatial channel characteristics represent at least one of: radio propagation conditions, channel correlation or covariance matrices determined from uplink measurements, and signal strength estimates.

Further, the spatial channel characteristics might comprise relative or absolute position information (such as direction of arrival information, channel covariance information, Euclidean direction information, global positioning system (GPS) information, etc.). In some aspects, the spatial channel characteristics comprise direction of arrival information of the radio propagation paths at the radio access network node. In some aspects, the spatial channel characteristics are exemplified by channel covariance information. In some aspects, the spatial channel characteristics comprise Euclidian direction information of the radio access network node and the terminal devices. The latter information may be obtained using information of the location of the radio access network node and the locations of the terminal devices. Particularly, according to an embodiment, the spatial channel characteristics for a given one of the terminal devices 130a is indicative of positional information of that given terminal device 130a.

There may be different ways for the network node 200, 110a, 110b, 110c to obtain the spatial channel characteristics.

In some aspects the spatial channel characteristics are obtained from terminal devices themselves or from a database.

The collection of spatial channel characteristics might be performed either in a distributed fashion, equipping each radio access network node with a database, or in a centralized fashion where a single network node collects all information. Particularly, according to an embodiment, the spatial channel characteristics are obtained from the set of currently and/or previously served terminal devices 130a, or from a database 120, or from at least one radio access network node 110a, 110b, 110c. The stored information can be periodically updated to capture the temporal variations (e.g. channel variations, terminal mobility events, etc.) and corresponding changes in spatial pattern in the wireless communications network 100a-100d.

In some aspects the spatial channel characteristics originate from actual measurements or from estimations. Particularly, according to an embodiment, the spatial channel characteristics originate from measurements made by the set of currently and/or previously served terminal devices 130a or are defined as estimated spatial channel characteristics.

As noted above, there could be terminal devices, such as terminal device 130b, that are part of the modified set of terminal devices but not the set of currently and/or previously served terminal devices. Such terminal devices might be explicitly identified and tagged. Particularly, according to an embodiment the network node 200, 110a, 110b, 110c is configured to perform (optional) step S110:

S110: The network node 200, 110a, 110b, 110c identifies any terminal devices 130b being part of the modified set of terminal devices 130a, 130b but not the set of currently and/or previously served terminal devices 130a.

The set of currently and/or previously served terminal devices is thus here to be interpreted as the set of currently and/or previously served terminal devices before updating and applying of the beam forming parameters as determined in step S106.

In some aspects it might be assumed that the terminal devices 130a, 130b move between different geographical locations. In some aspects the above disclosed methods therefore are periodically, or non-periodically, repeated so as to capture this movement of the terminal devices 130a, 130b in the wireless communications network 100a-100d and thus update the beam forming parameters accordingly. Particularly, according to an embodiment the network node 200, 110a, 110b, 110c is configured to perform (optional) step S112:

S112: The network node 200, 110a, 110b, 110c repeats the obtaining in step S102, the identifying in step S104, the determining in step S106, and the providing in step S108 with the modified set of terminal devices 130a, 130b acting as the set of currently and/or previously served terminal devices.

In some aspects there is a delay before the repetition, for example to decrease the rate of change. Particularly, according to an embodiment, the obtaining in step S102, the identifying in step S104, the determining in step S106, and the providing in step S108 is repeated only after a predetermined delay from having provided the notification of the determined beam forming parameters to the radio access network node 110a, 110b, 110c.

There may be different ways for the network node 200, 110a, 110b, 110c to determine the beam forming parameters in step S106. Particularly, according to an embodiment, the beam forming parameters are determined using a reconfigurable antenna system—self-organizing network (RAS-SON) algorithm.

There may be different ways for the network node 200, 110a, 110b, 110c to provide the notification in step S108. Particularly, according to an embodiment, the notification is provided as X2 interface signalling.

One illustrative example based on at least some of the above disclosed embodiments will now be disclosed.

In this example; the spatial channel characteristics considered are the positions of the radio access network nodes 110a, 110b, 110c and the terminal devices as well as measurements of received SNR at the radio access network nodes 110a, 110b, no. Active terminal devices (i.e. terminal devices within network coverage) signals to their serving radio access network node and inform the radio access network node of their location. The location is obtained through any localization technique, for example through GPS-assisted localization.

The radio access network nodes estimate channel characteristics such as received power levels (e.g. through pilot-assisted channel estimation). This information is stored in either a local database (i.e., distributed implementation) or in a centralized database (i.e., central implementation).

The network node 200, 110a, 110b, 110c obtains the collected information that is stored in all databases in the wireless communications network 100a-100d and determines the optimum antenna settings, such as optimum tilt, antenna orientation, antenna transmit power, etc., for each radio access network node in the wireless communications network 100a-100d by performing steps S102-S108. The antenna tilt of different radio access network nodes may be different in general and the optimization framework aims to maximize specific KPI in the network. In this example, average SIR of weak terminal device is selected as the KPI to be maximized. In general terms, the SIR measures the worst possible scenario of interference in the wireless communications network 100a-100d, so the optimized solution considering SIR as the objective gives a robust solution to all existing interference scenarios in a real wireless communications network 100a-100d.

The network coverage expansion goal is then succeeded when the number of terminal devices with the received uplink SNR greater than or equal to an SNR threshold value in the wireless communications network 100a-100d is increased. This criterion can be considered as one embodiment of the proposed solution. Other embodiments however may consider the link or system performance such as average throughput of all terminal devices, etc. as optimization criterion.

Figure 5:
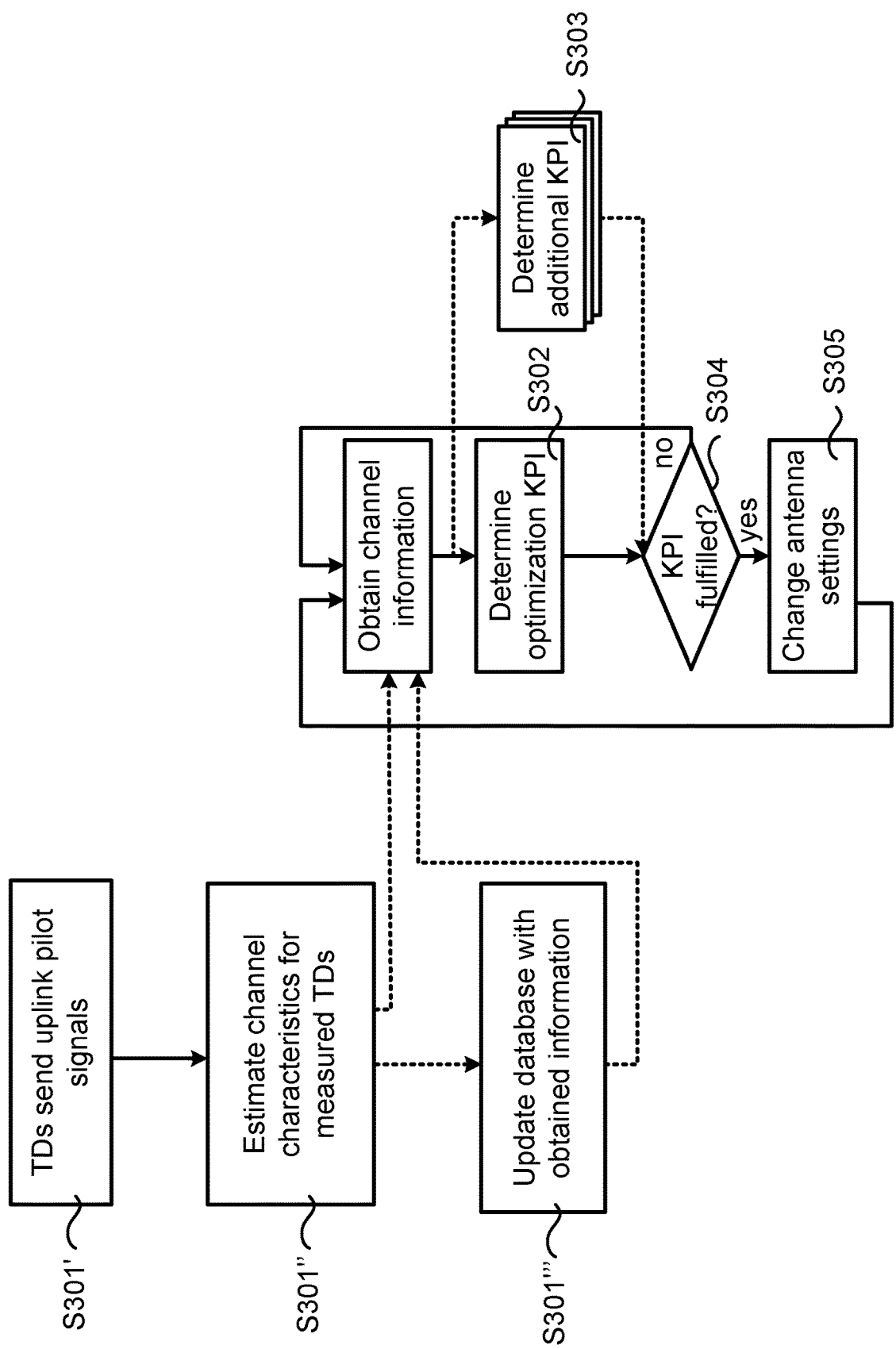

FIG. 5 is a flowchart illustrating a method for shaping cells 140a, 140b, 140c in a wireless communications network 100a, 100b, 100c, 100d as performed by the network node 200, 110a, 110b, 110c based on at least some of the above disclosed embodiments.

S301: The network node 200, 110a, 110b, 110c collects information about the radio access network nodes 110a, 110b, 110c and terminal devices currently in coverage. Either measurements of the currently active terminal devices is performed (S301' and S301"), or information is collected from a database (S301'''), or similar fashion. The information in the database (S301''') can come from measurements (S301'), estimations (S301") or other methods of insertion, such as manual, etc.

S302: Given the information obtained in S301, the network node 200, 110a, 110b, 110c determines beam forming parameters that optimize the given KPI metric.

S303: (Optional) The network node 200, 110a, 110b, 110c determines one or more additional KPIs.

S304: The network node 200, 110a, 110b, 110c checks if the KPI (or KPIs if two or more KPIs are used) are fulfilled. While determining the optimum KPI, as in S302, there is a possibility for the network node 200, 110a, 110b, 110c to evaluate additional KPIs, such as those that guarantee that network coverage is not lost at additional/other locations in the wireless communications network 100a-100d.

S305: If the KPI metrics are fulfilled, the network node 200, 110a, 110b, 110c changes the antenna setting, or notifies the radio access network nodes 110a, 100b, 100c to change the settings.

The network node 200, 110a, 110b, 110c might then return to step S301, possibly after a delay.

Figure 6:
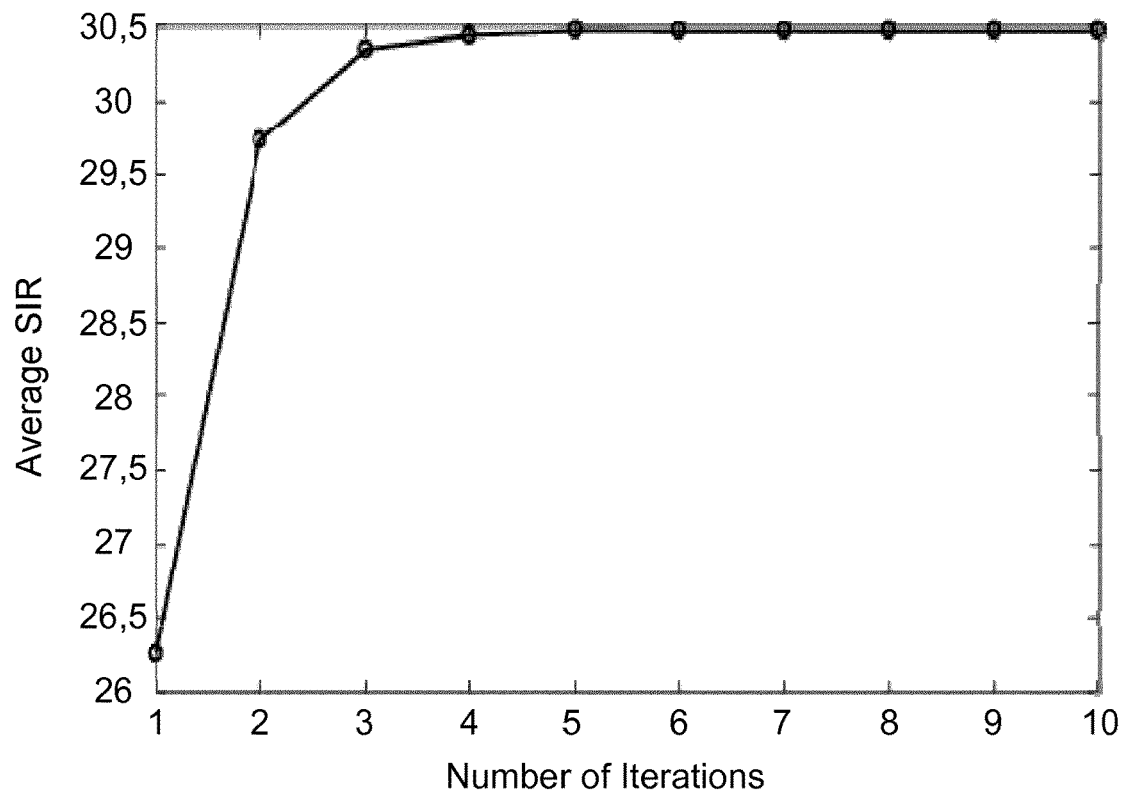
FIGS. 6, 7, and 8 show simulation results according to an embodiment.
Figure 7:
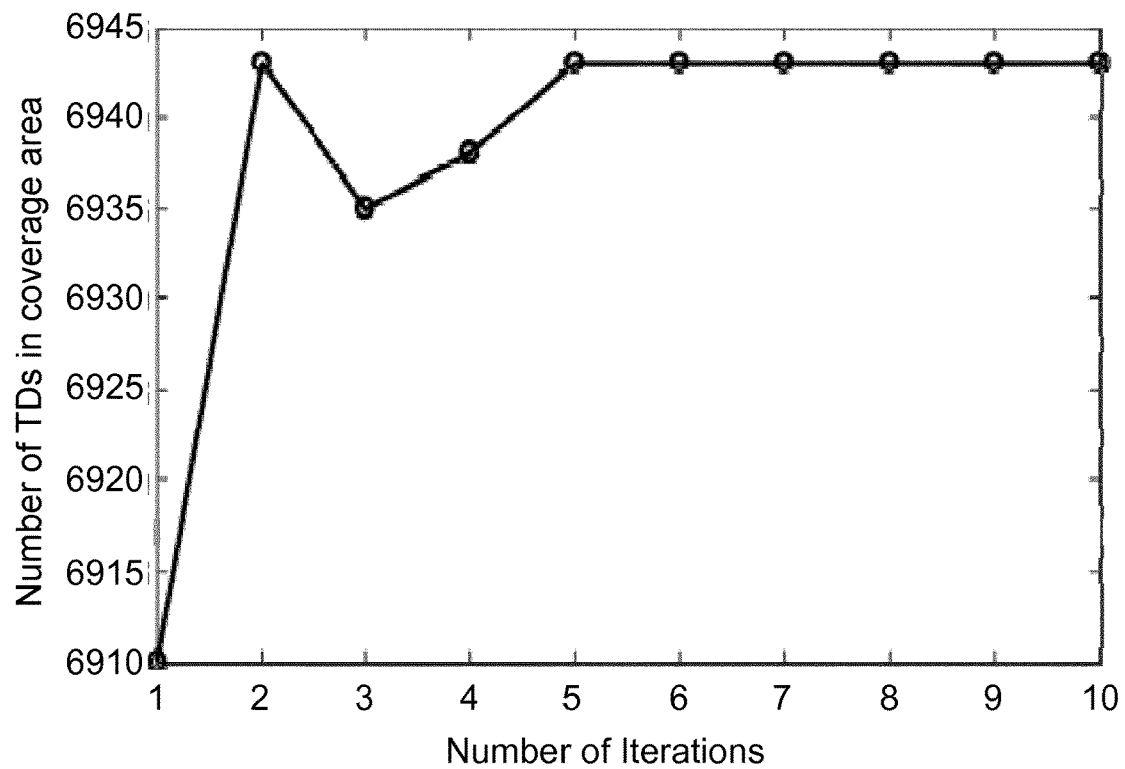
Figure 8:
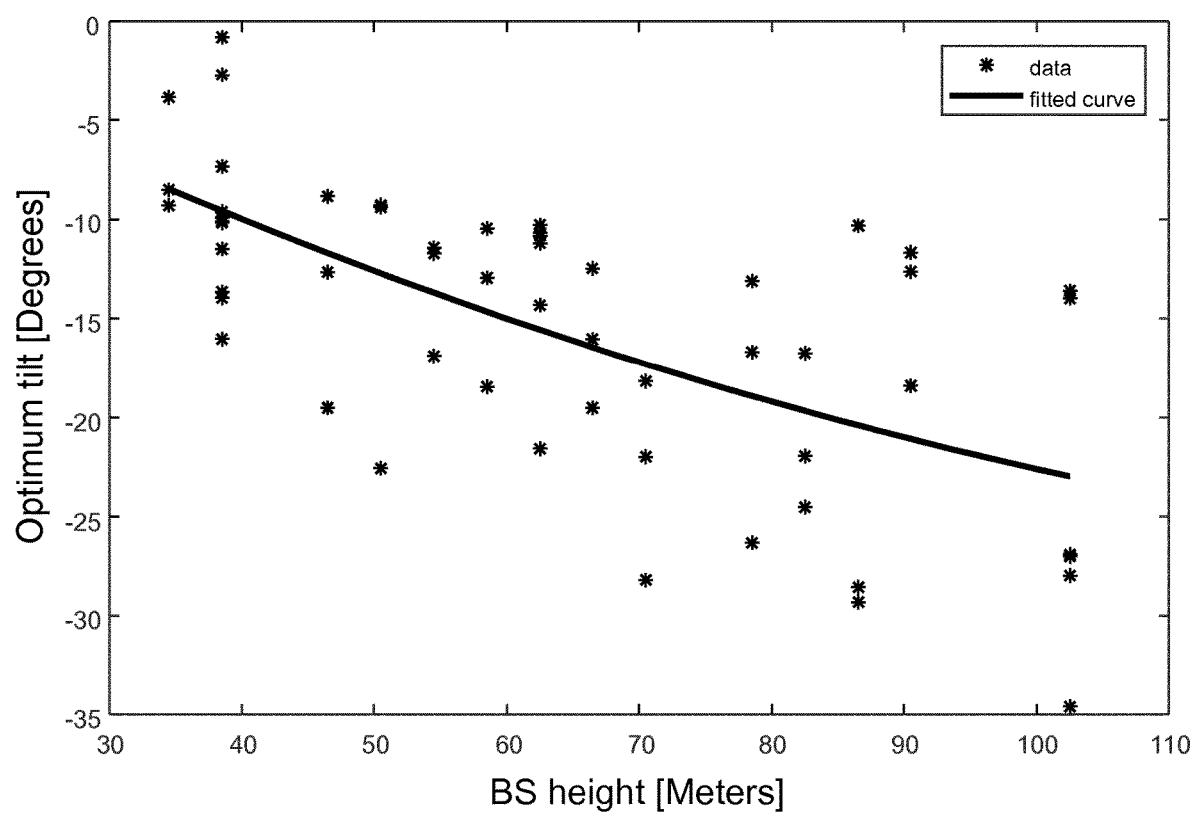

Reference is now made to FIGS. 6, 7 and 8. FIGS. 6, 7, 8 show simulation results according to embodiments. A threshold SNR is set for uplink transmission, so that only terminal devices that have an SNR larger than this value are considered to be within network coverage. For the terminal devices that are within network coverage, the optimum antenna tilt values are set so that the average SIR in downlink transmission is maximized.

FIG. 6 shows the average SIR at terminal devices that are within network coverage in different iterations of the method (where thus one iteration involves one occurrence of steps S102-S108 to be performed). The simulation results in FIG. 6 show that the average SIR in downlink transmission iteratively improves.

FIG. 7 shows the number of terminal devices that are within network coverage in different iterations of the method (where thus one iteration involves one occurrence of steps S102-S108 to be performed). The terminal devices for which the uplink SNR is larger than a given threshold are considered to be within network coverage. The simulation results in FIG. 7 show that there is an increasing trend for the number of terminal devices within network coverage as the number of iterations increases.

FIG. 8 shows the optimum tilt as a function of radio access network node height for different radio access network node in the simulated wireless communications network. The simulation results in FIG. 8 show that the optimum value of the antenna tilt differs across different radio access network nodes in the wireless communications network.

Figure 9:
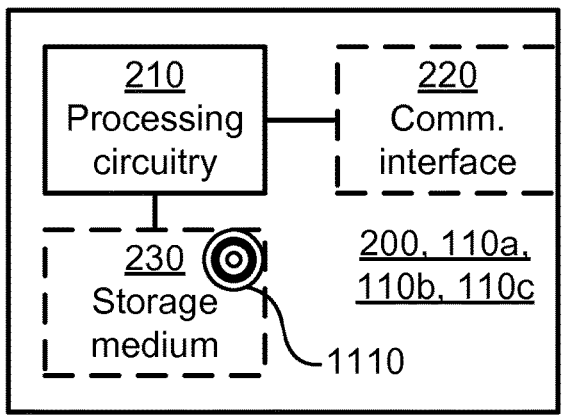
FIG. 9 is a schematic diagram showing functional units of a network node according to an embodiment.

FIG. 9 schematically illustrates, in terms of a number of functional units, the components of a network node 200, 110a, 110b, 110c according to an embodiment. Processing circuitry 210 is provided using any combination of one or more of a suitable central processing unit (CPU), multiprocessor, microcontroller, digital signal processor (DSP), etc., capable of executing software instructions stored in a computer program product 1110 (as in FIG. 11), e.g. in the form of a storage medium 230. The processing circuitry 210 may further be provided as at least one application specific integrated circuit (ASIC), or field programmable gate array (FPGA).

Particularly, the processing circuitry 210 is configured to cause the network node 200, 110a, 110b, 110c to perform a set of operations, or steps, S102-S112, S201-S209, S301-S305, as disclosed above. For example, the storage medium 230 may store the set of operations, and the processing circuitry 210 may be configured to retrieve the set of operations from the storage medium 230 to cause the network node 200, 110a, 110b, 110c to perform the set of operations. The set of operations may be provided as a set of executable instructions.

Thus the processing circuitry 210 is thereby arranged to execute methods as herein disclosed. The storage medium 230 may also comprise persistent storage, which, for example, can be any single one or combination of magnetic memory, optical memory, solid state memory or even remotely mounted memory. The network node 200, 110a, 110b, 110c may further comprise a communications interface 220 at least configured for communications with other nodes, devices, functions, and entities of the wireless communications network 100a-100d. As such the communications interface 220 may comprise one or more transmitters and receivers, comprising analogue and digital components.

The processing circuitry 210 controls the general operation of the network node 200, 110a, 110b, 110c e.g. by sending data and control signals to the communications interface 220 and the storage medium 230, by receiving data and reports from the communications interface 220, and by retrieving data and instructions from the storage medium 230. Other components, as well as the related functionality, of the network node 200, 110a, 110b, 110c are omitted in order not to obscure the concepts presented herein.

Figure 10:
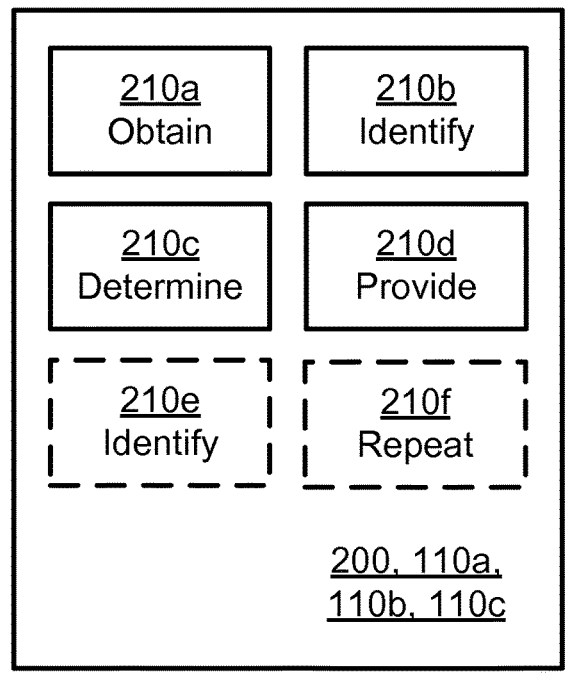
FIG. 10 is a schematic diagram showing functional modules of a network node according to an embodiment.

FIG. 10 schematically illustrates, in terms of a number of functional modules, the components of a network node 200, 110a, 110b, 110c according to an embodiment. The network node 200, 110a, 110b, 110c of FIG. 10 comprises a number of functional modules; an obtain module 210a configured to perform step S102, an identify module 210b configured to perform step S104, a determine module 210c configured to perform step S106, and a provide module 210d configured to perform step S108. The network node 200, 110a, 110b, 110c of FIG. 10 may further comprise a number of optional functional modules, such as any of an identify module 210c configured to perform step S110 and a repeat module 210f configured to perform step S112. In general terms, each functional module 210a-210f may in one embodiment be implemented only in hardware and in another embodiment with the help of software, i.e., the latter embodiment having computer program instructions stored on the storage medium 230 which when run on the processing circuitry makes the network node 200, 110a, 110b, 110c perform the corresponding steps mentioned above in conjunction with FIG. 10. It should also be mentioned that even though the modules correspond to parts of a computer program, they do not need to be separate modules therein, but the way in which they are implemented in software is dependent on the programming language used. Preferably, one or more or all functional modules 210a-210f may be implemented by the processing circuitry 210, possibly in cooperation with the communications interface 220 and/or the storage medium 230. The processing circuitry 210 may thus be configured to from the storage medium 230 fetch instructions as provided by a functional module 210a-210f and to execute these instructions, thereby performing any steps as disclosed herein.

The network node 200, 110a, 110b, 110c may be provided as a standalone device or as a part of at least one further device. For example, the network node 200, 110a, 110b, 110c may be provided in a node of a radio access network or in a node of a core network. Alternatively, functionality of the network node 200, 110a, 110b, 110c may be distributed between at least two devices, or nodes. These at least two nodes, or devices, may either be part of the same network part (such as the radio access network or the core network) or may be spread between at least two such network parts. In general terms, instructions that are required to be performed in real time may be performed in a device, or node, operatively closer to the cells 140a-140c than instructions that are not required to be performed in real time.

Thus, a first portion of the instructions performed by the network node 200, 110a, 110b, 110c may be executed in a first device, and a second portion of the of the instructions performed by the network node 200, 110a, 110b, 110c may be executed in a second device; the herein disclosed embodiments are not limited to any particular number of devices on which the instructions performed by the network node 200, 110a, 110b, 110c may be executed.

Hence, the methods according to the herein disclosed embodiments are suitable to be performed by a network node 200, 110a, 110b, 110c residing in a cloud computational environment. Therefore, although a single processing circuitry 210 is illustrated in FIG. 9 the processing circuitry 210 may be distributed among a plurality of devices, or nodes. The same applies to the functional modules 210a-210f of FIG. 10 and the computer program 1120 of FIG. 11 (see below).

Figure 11:
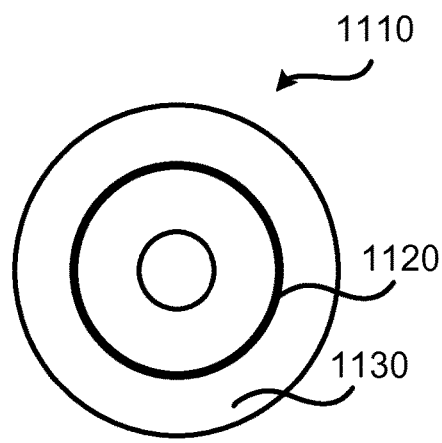
FIG. 11 shows one example of a computer program product comprising computer readable storage medium according to an embodiment.

FIG. 11 shows one example of a computer program product 1110 comprising computer readable storage medium 1130. On this computer readable storage medium 1130, a computer program 1120 can be stored, which computer program 1120 can cause the processing circuitry 210 and thereto operatively coupled entities and devices, such as the communications interface 220 and the storage medium 230, to execute methods according to embodiments described herein. The computer program 1120 and/or computer program product 1110 may thus provide means for performing any steps as herein disclosed.

In the example of FIG. 11, the computer program product 1110 is illustrated as an optical disc, such as a CD (compact disc) or a DVD (digital versatile disc) or a Blu-Ray disc. The computer program product 1110 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1120 is here schematically shown as a track on the depicted optical disk, the computer program 1120 can be stored in any way which is suitable for the computer program product 1110.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for shaping cells in a wireless communications network, the method being performed by a network node, the method comprising:
    obtaining spatial channel characteristics of a set of currently and/or previously served terminal devices in the wireless communications network, wherein the spatial channel characteristics are indicative of a current collective first network performance metric value for the set of currently and/or previously served terminal devices;
    identifying, using the spatial channel characteristics, those terminal devices of the set of currently and/or previously served terminal devices that have an individual second network performance metric value below a threshold value by comparing the individual second network performance metric value for each of the currently and/or previously served terminal devices to the threshold value;
    determining beam forming parameters for shaping the cells based on the identified terminal devices, wherein the cells are shaped to increase an individual first network performance metric value for the identified terminal devices, wherein the beam forming parameters give rise to a modified set of terminal devices being served in wireless communications network, and wherein spatial channel characteristics of the modified set of terminal devices are indicative of a new collective first network performance metric value for the modified set of terminal devices; and
    providing a notification of the determined beam forming parameters to a radio access network node only when the new collective first network performance metric value is not worse than the current collective first network performance metric value.

2. The method of claim 1, wherein the second network performance metric value is: a signal to noise ratio (SNR) value, a signal to interference (SIR) value, a signal to interference plus noise ratio (SINR) value, a signal power value, an error rate value, or a throughput value.

3. The method of claim 1, wherein the first network performance metric value acts as a key performance indicator (KPI) value for a KPI, and wherein the beam forming parameters are determined so as to optimize the KPI.

4. The method of claim 1, wherein the first network performance metric value is a signal to interference value, an average throughput value, a signal to noise ratio value, a signal to interference plus noise ratio value, a signal power value, or an error rate value.

5. The method of claim 4, wherein the first network performance metric value for a given one of the terminal devices is based on at least one of transmit power, path loss, and antenna gain for that given terminal device.

6. The method of claim 4, wherein the first network performance metric value for a given one of the terminal devices is a function of pointing direction of the radio access network node.

7. The method of claim 4, wherein the signal to interference (SIR) between terminal device k and network node n is denoted $SIR_k^n$ and is determined as:

$$SIR_k^n = \frac{P^n G_k^n(\theta_k^n, \varphi_k^n, \theta_{ant}^n, \varphi_{ant}^n)\alpha_k^n}{\sum_{m \in N-\{n\}} P^m G_k^m(\theta_k^m, \varphi_k^m, \theta_{ant}^m, \varphi_{ant}^m)\alpha_k^m}.$$

8. The method of claim 1, wherein the notification only is provided when each terminal device of the set of currently and/or previously served terminal devices is also part of the modified set of terminal devices and/or where there are more terminal devices in the modified set of terminal devices than in the set of currently and/or previously served terminal devices.

9. The method of claim 1, wherein the notification only is provided when each terminal device of the set of currently and/or previously served terminal devices having spatial channel characteristics not older than a threshold time value is also part of the modified set of terminal devices and/or where there are more terminal devices in the modified set of terminal devices than in the set of currently and/or previously served terminal devices.

10. The method of claim 1, further comprising:
    identifying any terminal devices being part of the modified set of terminal devices but not the set of currently and/or previously served terminal devices.

11. The method of claim 1, further comprising:
    repeating said obtaining, said identifying, said determining, and said providing with the modified set of terminal devices acting as the set of currently and/or previously served terminal devices.

12. The method of claim 11, wherein said obtaining, said identifying, said determining, and said providing is repeated only after a predetermined delay from having provided the notification of the determined beam forming parameters to the radio access network node.

13. The method of claim 1, wherein beam forming parameters for shaping the cells are determined for, and the notification provided to, at least two radio access network nodes.

14. The method of claim 1, wherein the spatial channel characteristics are obtained from the set of currently and/or previously served terminal devices, or from a database, or from at least one radio access network node.

15. The method of claim 1, wherein the spatial channel characteristics originate from measurements made by the set of currently and/or previously served terminal devices or are defined as estimated spatial channel characteristics.

16. The method of claim 1, wherein the spatial channel characteristics represent at least one of: radio propagation conditions, channel correlation or covariance matrices determined from uplink measurements, and signal strength estimates.

17. The method of claim 1, wherein the spatial channel characteristics for a given one of the terminal devices is indicative of positional information of that given terminal device.

18. The method of claim 1, wherein
    the beam forming parameters are determined using a reconfigurable antenna system—self-organizing network algorithm, and/or
    the notification is provided as X2 interface signalling.

19. A network node for shaping cells in a wireless communications network, the network node comprising:
processing circuitry, the processing circuitry being configured to cause the network node to:
obtain spatial channel characteristics of a set of currently and/or previously served terminal devices in the wireless communications network, wherein the spatial channel characteristics are indicative of a current collective first network performance metric value for the set of currently and/or previously served terminal devices;
identify, using the spatial channel characteristics, those terminal devices of the set of currently and/or previously served terminal devices that have an individual second network performance metric value below a threshold value by comparing the individual second network performance metric value for each of the currently and/or previously served terminal devices to the threshold value;
determine beam forming parameters for shaping the cells based on the identified terminal devices, wherein the cells are shaped to increase an individual first network performance metric value for the identified terminal devices, wherein the beam forming parameters give rise to a modified set of terminal devices being served in wireless communications network, and wherein spatial channel characteristics of the modified set of terminal devices are indicative of a new collective first network performance metric value for the modified set of terminal devices; and
provide a notification of the determined beam forming parameters to a radio access network node only when the new collective first network performance metric value is not worse than the current collective first network performance metric value.

20. A computer program product comprising a non-transitory computer readable medium storing a computer program for shaping cells in a wireless communications network, the computer program comprising computer code which, when run on processing circuitry of a network node, causes the network node to:
obtain spatial channel characteristics of a set of currently and/or previously served terminal devices in the wireless communications network, wherein the spatial channel characteristics are indicative of a current collective first network performance metric value for the set of currently and/or previously served terminal devices;
identify, using the spatial channel characteristics, those terminal devices of the set of currently and/or previously served terminal devices that have an individual second network performance metric value below a threshold value by comparing the individual second network performance metric value for each of the currently and/or previously served terminal devices to the threshold value;
determine beam forming parameters for shaping the cells based on the identified terminal devices, wherein the cells are shaped to increase an individual first network performance metric value for the identified terminal devices, wherein the beam forming parameters give rise to a modified set of terminal devices a, being served in wireless communications network, and wherein spatial channel characteristics of the modified set of terminal devices are indicative of a new collective first network performance metric value for the modified set of terminal devices; and
provide a notification of the determined beam forming parameters to a radio access network node only when the new collective first network performance metric value is not worse than the current collective first network performance metric value.

* * * * *